(12) United States Patent
Gurevich

(10) Patent No.: US 12,014,479 B2
(45) Date of Patent: Jun. 18, 2024

(54) MEDICAL IMAGING

(71) Applicant: Stryker Corporation, Kalamazoo, MI (US)

(72) Inventor: Lina Gurevich, Vancouver (CA)

(73) Assignee: Stryker Corporation, Kalamazoo, MI (US)

( * ) Notice: Subject to any disclaimer, the term of this patent is extended or adjusted under 35 U.S.C. 154(b) by 0 days.

(21) Appl. No.: 17/658,986

(22) Filed: Apr. 12, 2022

(65) Prior Publication Data

US 2022/0375047 A1 Nov. 24, 2022

Related U.S. Application Data

(60) Provisional application No. 63/189,374, filed on May 17, 2021.

(51) Int. Cl.
| | | |
|---|---|---|
| G06T 5/00 | (2006.01) | |
| G06T 5/50 | (2006.01) | |
| G06T 5/92 | (2024.01) | |
| G06T 7/11 | (2017.01) | |
| G06T 11/00 | (2006.01) | |

(52) U.S. Cl.
CPC .............. *G06T 5/92* (2024.01); *G06T 5/50* (2013.01); *G06T 7/11* (2017.01); *G06T 11/00* (2013.01); *G06T 2207/10064* (2013.01); *G06T 2207/20016* (2013.01); *G06T 2207/20081* (2013.01); *G06T 2207/20084* (2013.01); *G06T 2210/41* (2013.01)

(58) Field of Classification Search
CPC ... G06T 5/009; G06T 7/11; G06T 5/50; G06T 11/00; G06T 2207/10064; G06T 2207/20016

USPC ........................................................ 345/589
See application file for complete search history.

(56) References Cited

U.S. PATENT DOCUMENTS

| | | | |
|---|---|---|---|
| 10,242,292 B2 | 3/2019 | Zisimopoulos | |
| 10,810,460 B2 | 10/2020 | Ngo Dinh | |
| 2014/0028824 A1* | 1/2014 | Kubo ................... | A61B 1/0638 348/77 |
| 2017/0038951 A1* | 2/2017 | Reicher ................ | G06F 16/583 |
| 2017/0181701 A1* | 6/2017 | Fehrenbacher .... | A61B 18/1445 |

(Continued)

FOREIGN PATENT DOCUMENTS

WO    2020017213 A1    1/2020

OTHER PUBLICATIONS

EnlightenGAN: Deep Light Enhancement without Paired Supervision; Yifan Jiang et al., 2015.*

(Continued)

*Primary Examiner* — Javid A Amini
(74) *Attorney, Agent, or Firm* — Morrison & Foerster LLP

(57) ABSTRACT

The present disclosure relates generally to medical imaging, and more specifically to enhancing medical images (e.g., images taken in low-light conditions) using machine-learning techniques. An exemplary method of obtaining an enhanced fluorescence medical image of a subject comprises: receiving a fluorescence medical image of the subject (e.g., NIR images); providing the fluorescence medical image to a generator of a trained generative adversarial network (GAN) model trained using a plurality of white light images; and obtaining, from the generator, the enhanced fluorescence medical image of the subject.

21 Claims, 13 Drawing Sheets
(3 of 13 Drawing Sheet(s) Filed in Color)

(56) References Cited

U.S. PATENT DOCUMENTS

| | | | |
|---|---|---|---|
| 2019/0247126 A1* | 8/2019 | Ikehara | A61B 1/043 |
| 2019/0252073 A1 | 8/2019 | Hsu | |
| 2019/0325574 A1 | 10/2019 | Jin | |
| 2020/0273575 A1* | 8/2020 | Wolf | G16H 20/40 |
| 2022/0074994 A1* | 3/2022 | Senn | G01R 31/367 |
| 2023/0036068 A1* | 2/2023 | Gurevich | G06T 7/0012 |
| 2023/0081866 A1* | 3/2023 | Gurevich | A61B 1/000094 |
| | | | 600/408 |
| 2023/0122835 A1* | 4/2023 | Maske | G06T 7/0012 |
| | | | 382/167 |

OTHER PUBLICATIONS

International Preliminary Report on Patentability mailed Nov. 21, 2023, directed to International Application No. PCT/US2022/024449; 8 pages.

International Search Report and Written Opinion mailed Jul. 29, 2022, directed to International Application No. PCT/US2022/024449; 12 pages.

Jian et al. (Jun. 17, 2019). "EnlightenGAN: Deep Light Enhancement without Paired Supervision," arXiv:1906.06972; 11 pages.

Kourou et al. (2015). "Machine learning applications in cancer prognosis and prediction," Computational and Structural Biotechnology Journal 13: 10 pages.

Ma et al. (2020). "Cycle Structure and Illumination Constrained GAN for Medical Image Enhancement," Springer Nature Switzerland AG, 667-677.

Turan et al. (Feb. 2016). "ROI and Blood Vessel Segmentation Based on Gradient Vector Algorithm in RGB Retinal Fundus Images," International Journal of Research Studies in Science, Engineering, and Technology 3(2): 1-5.

Wimmer et al. (Apr. 27, 2020). "Improving Endoscopic Decision Support Systems by Translating Between Imaging Modalities," arXiv:2004.12604; 10 pages.

\* cited by examiner

WHITE LIGHT FRAME

RAW FLUORESCENCE FRAME

FLUORESCENCE FRAME ENHANCED USING AHE

500

502
RECEIVING A FLUORESCENCE MEDICAL IMAGE OF THE SUBJECT

504
PROVIDING THE FLUORESCENCE MEDICAL IMAGE TO A GENERATOR OF A TRAINED GENERATIVE ADVERSARIAL NETWORK (GAN) MODEL TRAINED USING A PLURALITY OF WHITE LIGHT IMAGES

506
OBTAINING, FROM THE GENERATOR, THE ENHANCED FLUORESCENCE MEDICAL IMAGE OF THE SUBJECT

FIG. 5A

MEDICAL IMAGING

CROSS-REFERENCE TO RELATED APPLICATIONS

This application claims the benefit of U.S. Provisional Application 63/189,374, filed May 17, 2021, the entire contents of which are hereby incorporated by reference herein.

FIELD

The present disclosure relates generally to medical imaging, and more specifically to enhancing medical images (e.g., images taken in low-light conditions) using machine-learning techniques.

BACKGROUND

Due to constraints in clinical settings, acquired medical images may include noise and artifacts, thus reducing the diagnostic quality of the images. In particular, images captured in low-light conditions suffer from low contrast, poor visibility, and noise contamination.

These images have reduced value to medical practitioners, as well as to computer-based diagnostic and treatment systems. For medical practitioners, these images have reduced diagnostic value because human visual perception prefers high-visibility images (e.g., images taken in conditions with higher received light levels for imaging). For diagnostic and treatment systems, the performance of computer vision algorithms may be compromised if the low-light images are used as training data or input data due to their poor quality.

SUMMARY

Disclosed herein are exemplary devices, apparatuses, systems, methods, computer program products and non-transitory storage media for enhancing low-light images, including fluorescence images (e.g., near-infrared or NIR images), and endoscopic images. The systems, devices, and methods may be used for imaging tissue of a subject, such as in endoscopic imaging procedures. Imaging may be performed pre-operatively, intra-operatively, post-operatively, and during diagnostic imaging sessions and procedures. The imaging methods per se may exclude insertion of an endoscopic imager into a lumen in the body. The imaging methods per se may exclude any invasive surgical step.

Specifically, some examples of the disclosure can enhance a fluorescence medical image to generate an enhanced image with higher contrast and more details without enhancing noise in the fluorescence image, thus outperforming traditional contrast enhancement algorithms. Techniques described herein can be used to enhance low-light images taken during surgical procedures (e.g., where fluorescence is used), such as plastic reconstruction surgeries, open wound surgeries, etc.

Further, some examples of the disclosure can enhance noisy, low-light endoscopic images to generate high-quality endoscopic images without relying on complex hardware, thus reducing the overall cost of the system. As described herein, state-of-the-art endoscopic cameras cannot be made smaller without compromising quality of the acquired images. In other words, there is a certain minimum size threshold below which the camera would not be able to absorb enough light to produce legible/usable images. The techniques described herein allow various systems to be equipped with smaller, cheaper cameras, and potentially lead to development of novel clinical applications that are currently not feasible due to the minimum size requirements for the camera components.

Some examples of the present disclosure include unsupervised generative adversarial network (GAN) models that can be effectively trained for the purposes of real-time high-quality reconstruction and enhancement of low-light images without using exactly paired images as training data. An exemplary GAN model can rely on unsupervised training using unpaired low-light/normal-light image datasets and learn a mapping between low-light and normal-light image spaces. In some examples, the GAN model adopts an attention-guided U-Net as the generator, uses a global-local discriminator structure that handles spatially-varying light conditions in the input image, and employs self-regularization by using a feature preserving loss, as described in detail herein.

According to an aspect, a method of obtaining an enhanced fluorescence medical image of a subject comprises receiving a fluorescence medical image of the subject; providing the fluorescence medical image to a generator of a trained generative adversarial network (GAN) model trained using a plurality of white light images; and obtaining, from the generator, the enhanced fluorescence medical image of the subject.

The method can further comprise displaying the enhanced fluorescence medical image.

The method can further comprise applying a color scheme to the enhanced fluorescence medical image to indicate one or more regions of interest.

The method can further comprise displaying the enhanced fluorescence medical image overlaid on a white light image of the subject.

The white light image can be a greyscale white light image.

The method can further comprise segmenting the enhanced fluorescence medical image to indicate one or more regions of interest.

The one or more regions of interest can comprise a bile duct, a tumor, a blood vessel, a region of skin tissue, a urinary vessel, a lymph channel, or a lymph node.

The method can further comprise providing the enhanced fluorescence medical image to a classification model to identify a disease.

The method can further comprise generating a prognosis for an outcome based on the enhanced fluorescence medical image.

The method can further comprise training a machine-learning model using the enhanced fluorescence medical image.

The method can further comprise training the generator using a set of fluorescence medical images and a set of white light images.

The set of white light images can be greyscale images.

The set of fluorescence medical images can be acquired using a first camera, and the set of white light images can be surgical images acquired with a second camera having a higher resolution than the first camera.

The generator can comprise a trained U-net neural network.

The generator can comprise an attention map.

The generator can be trained using a self feature preserving loss.

The GAN model can include one or more discriminators.

The one or more discriminators can comprise a local discriminator and a global discriminator.

The GAN model can comprises an EnlightenGAN model.

According to an aspect, a system comprises one or more processors; one or more memories; and one or more programs, wherein the one or more programs are stored in the one or more memories and configured to be executed by the one or more processors, the one or more programs including instructions for receiving a fluorescence medical image of the subject; providing the fluorescence medical image to a generator of a trained generative adversarial network (GAN) model trained using a plurality of white light images; and obtaining, from the generator, the enhanced fluorescence medical image of the subject.

According to an aspect, a method for obtaining an enhanced endoscopic image of a subject, comprises receiving an endoscopic image of the subject; providing the endoscopic image to a generator of a trained generative adversarial network (GAN) model trained using a plurality of non-endoscopic white light images; and obtaining, from the generator, the enhanced endoscopic image.

According to an aspect, a system comprises one or more processors; one or more memories; and one or more programs, wherein the one or more programs are stored in the one or more memories and configured to be executed by the one or more processors, the one or more programs including instructions for receiving an endoscopic image of the subject; providing the endoscopic image to a generator of a trained generative adversarial network (GAN) model trained using a plurality of non-endoscopic white light images; and obtaining, from the generator, the enhanced endoscopic image.

According to an aspect, a non-transitory computer-readable storage medium stores one or more programs, the one or more programs comprising instructions, which when executed by one or more processors of an electronic device, cause the electronic device to perform any of the methods described herein.

According to an aspect, a computer program product includes software code which when executed by one or more processors of an electronic device, cause the electronic device to perform any of the methods described herein.

It will be appreciated that any one or more of the above aspects, features and options can be combined. It will be appreciated that any one of the options described in view of one of the aspects can be applied equally to any of the other aspects. It will also be clear that all aspects, features and options described in view of the systems apply equally to the methods, computer-readable storage medium, and computer program product.

BRIEF DESCRIPTION OF THE FIGURES

The patent or application file contains at least one drawing executed in color. Copies of this patent or patent application publication with color drawing(s) will be provided by the Office upon request and payment of the necessary fee.

The invention will now be described, by way of example only, with reference to the accompanying drawings, in which:

FIG. 5A is an illustration of an exemplary process for obtaining an enhanced medical image of a subject, according to some examples;

DETAILED DESCRIPTION

Figure 1:
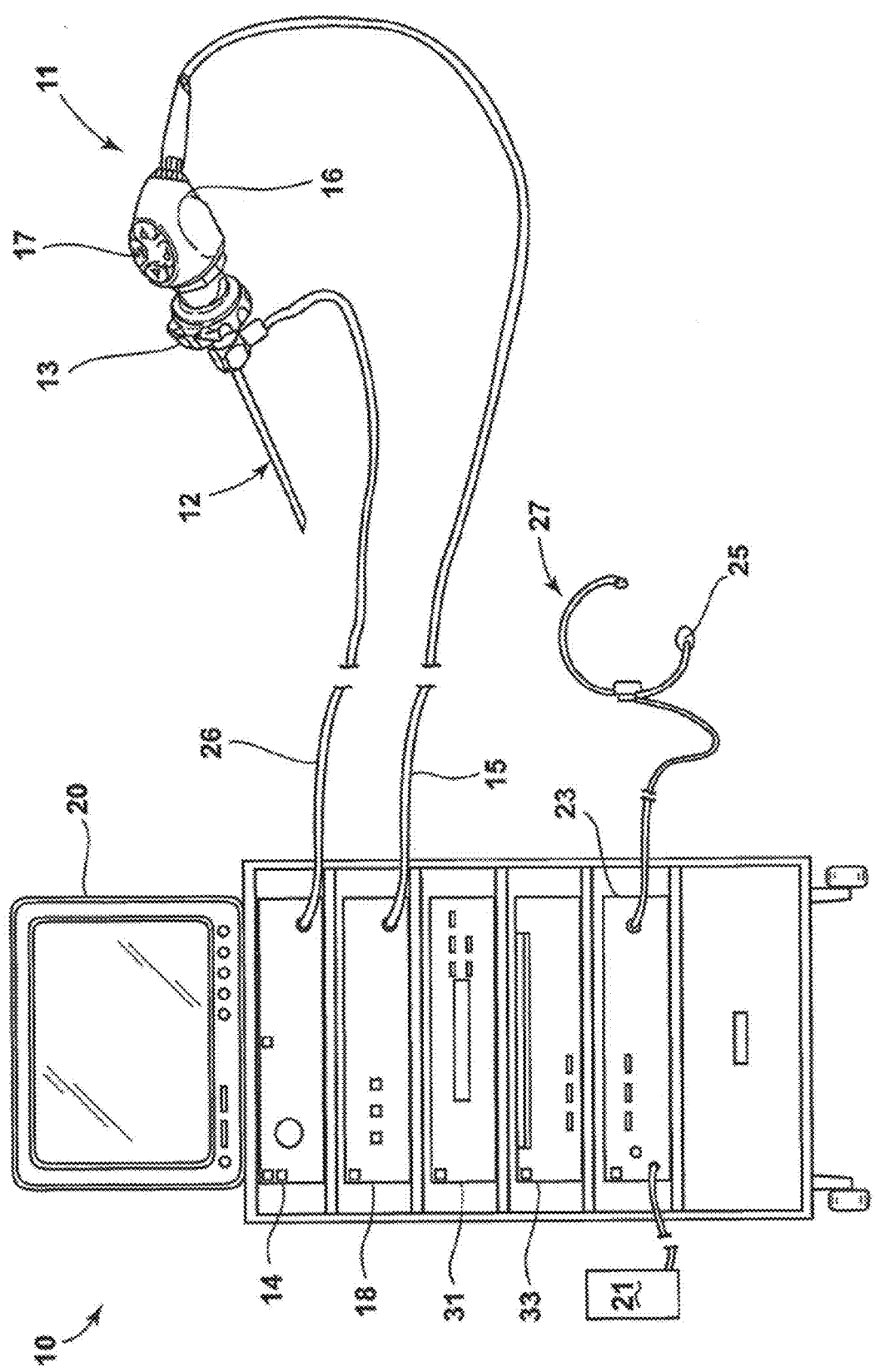
FIG. 1 is an illustration of an endoscopic camera system, according to some examples.

Reference will now be made in detail to implementations and embodiments of various aspects and variations of systems and methods described herein. Although several exemplary variations of the systems and methods are described herein, other variations of the systems and methods may include aspects of the systems and methods described herein combined in any suitable manner having combinations of all or some of the aspects described. Examples will now be described more fully hereinafter with reference to the accompanying drawings; however, they may be embodied in different forms and should not be construed as limited to the embodiments set forth herein. Rather, these examples are provided so that this disclosure will be thorough and complete, and will fully convey exemplary implementations to those skilled in the art.

Disclosed herein are exemplary devices, apparatuses, systems, methods, and non-transitory storage media for enhancing low-light images, including fluorescence medical images (e.g., NIR medical images) and endoscopic images. The systems, devices, and methods may be used for imaging tissue of a subject, such as in endoscopic imaging procedures. Imaging may be performed pre-operatively, intra-operatively, post-operatively, and during diagnostic imaging sessions and procedures. The imaging methods per se may exclude insertion of an endoscopic imager into a lumen in the body. The endoscopic imager may be inserted prior to the imaging methods. The imaging methods per se may exclude any invasive surgical step.

Specifically, some examples of the disclosure can enhance a fluorescence medical image (e.g., NIR medical image) to generate an enhanced image with higher contrast and more details without enhancing noise in the image, thus outperforming traditional contrast enhancement algorithms. Techniques described herein can be used to enhance low-light images taken during surgical procedures (e.g., where fluorescence is used), such as plastic reconstruction surgeries, open wound surgeries, etc.

Further, some examples of the disclosure can enhance noisy, low-light endoscopic images to generate high-quality endoscopic images without relying on complex hardware, thus reducing the overall cost of the system. As described herein, state-of-the-art endoscopic cameras cannot be made smaller without compromising quality of the acquired images. In other words, there is a certain minimum size threshold below which the camera would not be able to absorb enough light to produce legible images. The techniques described herein allow various systems to be equipped with smaller, cheaper cameras, and potentially lead to development of novel clinical applications that are currently not feasible due to the minimum size requirements for the camera components.

Some examples of the present disclosure include unsupervised GAN models that can be effectively trained for the purposes of real-time high-quality reconstruction and enhancement of low-light images without using exactly paired images as training data. An exemplary GAN model can rely on unsupervised training using unpaired low-light/normal-light image datasets and learn a mapping between low-light and normal-light image spaces. In some examples, the GAN model adopts an attention-guided U-Net as the generator, uses a global-local discriminator structure that handles spatially-varying light conditions in the input image, and employs self-regularization by using a feature preserving loss, as described in detail herein.

In the following description, it is to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain aspects of the present disclosure include process steps and instructions described herein in the form of an algorithm. It should be noted that the process steps and instructions of the present disclosure could be embodied in software, firmware, or hardware and, when embodied in software, could be downloaded to reside on and be operated from different platforms used by a variety of operating systems. Unless specifically stated otherwise as apparent from the following discussion, it is appreciated that, throughout the description, discussions utilizing terms such as "processing," "computing," "calculating," "determining," "displaying," "generating" or the like, refer to the action and processes of a computer system, or similar electronic computing device, that manipulates and transforms data represented as physical (electronic) quantities within the computer system memories or registers or other such information storage, transmission, or display devices.

The present disclosure in some embodiments also relates to a device for performing the operations herein. This device may be specially constructed for the required purposes, or it may comprise a general purpose computer selectively activated or reconfigured by a computer program stored in the computer. Such a computer program may be stored in a non-transitory, computer readable storage medium, such as, but not limited to, any type of disk, including floppy disks, USB flash drives, external hard drives, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein.

FIG. 1 shows an example of an endoscopic imaging system 10, which includes a scope assembly 11 which may be utilized in endoscopic procedures. The scope assembly 11 incorporates an endoscope or scope 12 which is coupled to a camera head 16 by a coupler 13 located at the distal end of the camera head 16. Light is provided to the scope by a light source 14 via a light guide 26, such as a fiber optic cable. The camera head 16 is coupled to a camera control unit (CCU) 18 by an electrical cable 15. The CCU 18 is connected to, and communicates with, the light source 14. Operation of the camera 16 is controlled, in part, by the CCU 18. The cable 15 conveys video image and/or still image data from the camera head 16 to the CCU 18 and may convey various control signals bi-directionally between the camera head 16 and the CCU 18.

A control or switch arrangement 17 may be provided on the camera head 16 for allowing a user to manually control various functions of the system 10, which may include switch from one imaging mode to another, as discussed further below. Voice commands may be input into a microphone 25 mounted on a headset 27 worn by the practitioner and coupled to the voice-control unit 23. A hand-held control device 29, such as a tablet with a touch screen user interface or a PDA, may be coupled to the voice control unit 23 as a further control interface. In the illustrated embodiment, a recorder 31 and a printer 33 are also coupled to the CCU 18. Additional devices, such as an image capture and archiving device, may be included in the system 10 and coupled to the CCU 18. Video image data acquired by the camera head 16 and processed by the CCU 18 is converted to images, which can be displayed on a monitor 20, recorded by recorder 31, and/or used to generate static images, hard copies of which can be produced by the printer 33.

Figure 2:
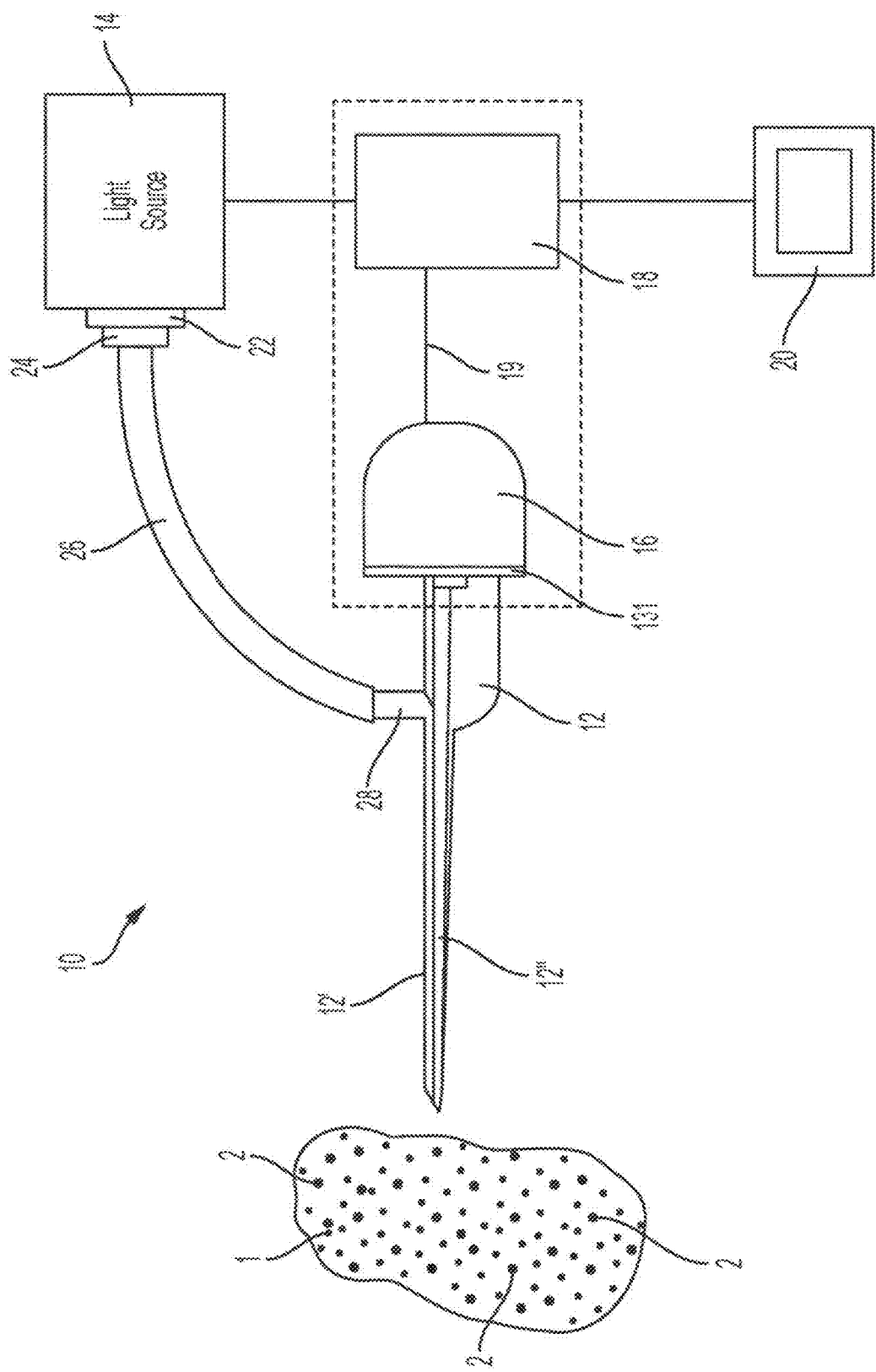
FIG. 2 is a diagram of a portion of the endoscopic camera system of FIG. 1 and a target object for imaging, according to some examples.

FIG. 2 shows an example of a portion of the endoscopic system 10 being used to illuminate and receive light from an object 1, such as a surgical site of a patient. The object 1 may include fluorescent markers 2, for example, as a result of the patient being administered a fluorescence imaging agent. The fluorescent markers 2 may be comprised of, for example, indocyanine green (ICG).

The light source 14 can generate visible illumination light (such as any combination of red, green, and blue light) for generating visible (e.g., white light) images of the target object 1 and can also produce fluorescence excitation illumination light for exciting the fluorescent markers 2 in the target object for generating fluorescence images. Illumination light is transmitted to and through an optic lens system 22 which focuses light onto a light pipe 24. The light pipe 24 may create a homogeneous light, which is then transmitted to the fiber optic light guide 26. The light guide 26 may include multiple optic fibers and is connected to a light post 28, which is part of the endoscope 12. The endoscope 12 includes an illumination pathway 12' and an optical channel pathway 12".

The endoscope 12 may include a notch filter 131 that allows some or all (preferably, at least 80%) of fluorescence emission light (e.g., in a wavelength range of 830 nm to 870 nm) emitted by fluorescence markers 2 in the target object 1 to pass therethrough and that allows some or all (preferably, at least 80%) of visible light (e.g., in the wavelength range of 400 nm to 700 nm), such as visible illumination light reflected by the target object 1, to pass therethrough, but that blocks substantially all of the fluorescence excitation light (e.g., infrared light having a wavelength of 808 nm) that is used to excite fluorescence emission from the fluorescent marker 2 in the target object 1. The notch filter 131 may have an optical density of OD5 or higher. In some embodiments, the notch filter 131 can be located in the coupler 13.

Figure 3:
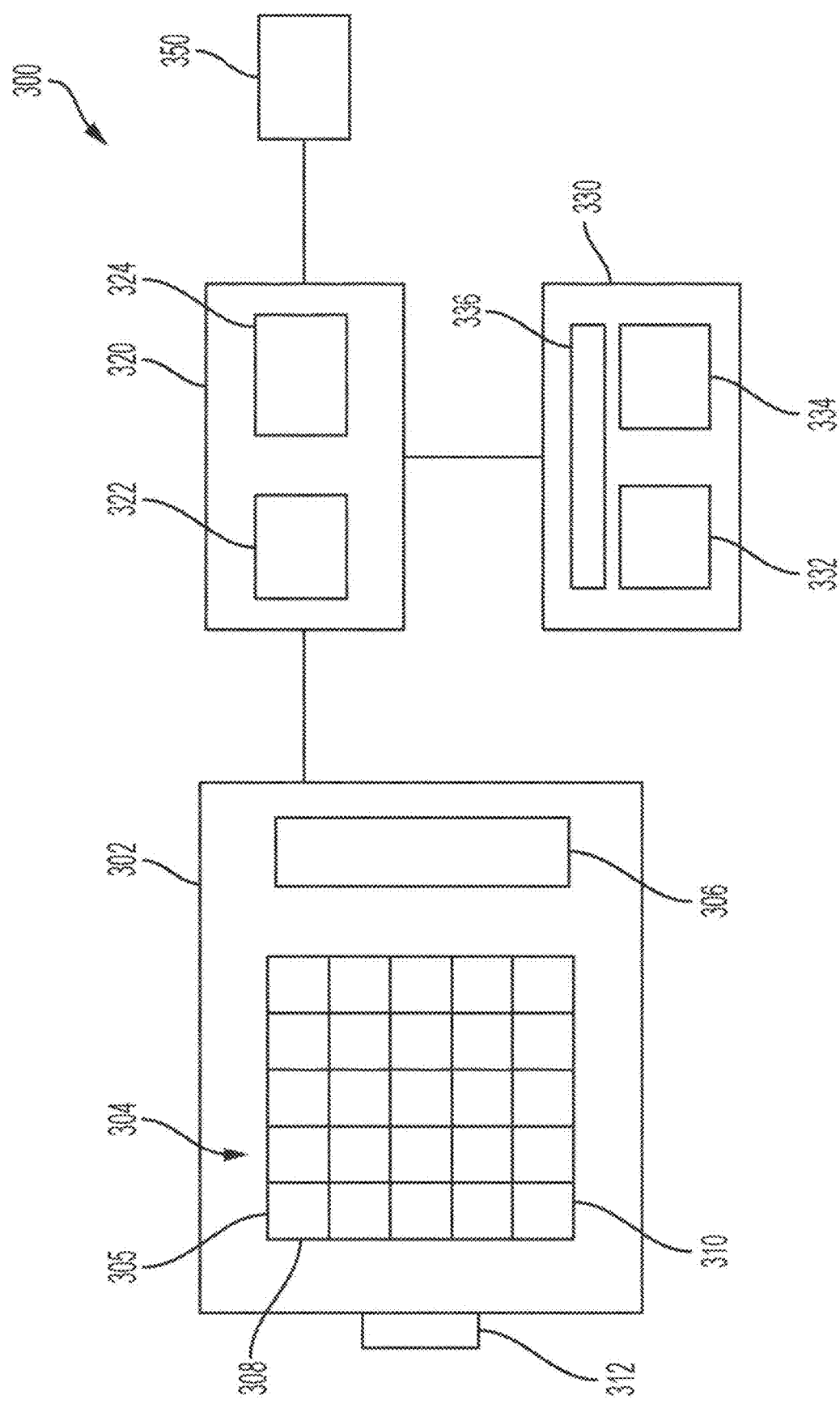
FIG. 3 is a block diagram of an imaging system, according to some examples.

FIG. 3 schematically illustrates an exemplary imaging system 300 that employs an electronic imager 302 to generate images (e.g., still and/or video) of a target object, such as a target tissue of a patient, according to some embodiments. The imager 302 may be a rolling shutter imager (e.g., CMOS sensors) or a global shutter imager (e.g., CCD sensors). System 300 may be used, for example, for the endoscopic imaging system 10 of FIG. 1. The imager 302 includes a CMOS sensor 304 having an array of pixels 305 arranged in rows of pixels 308 and columns of pixels 310. The imager 302 may include control components 306 that control the signals generated by the CMOS sensor 304. Examples of control components include gain circuitry for generating a multi-bit signal indicative of light incident on each pixel of the sensor 304, one or more analog-to-digital converters, one or more line drivers to act as a buffer and provide driving power for the sensor 304, row circuitry, and timing circuitry. A timing circuit may include components such as a bias circuit, a clock/timing generation circuit, and/or an oscillator. Row circuitry may enable one or more processing and/or operational tasks such as addressing rows of pixels 308, addressing columns of pixels 310, resetting charge on rows of pixels 308, enabling exposure of pixels 305, decoding signals, amplifying signals, analog-to-digital signal conversion, applying timing, read out and reset signals and other suitable processes or tasks. Imager 302 may also include a mechanical shutter 312 that may be used, for example, to control exposure of the image sensor 304 and/or to control an amount of light received at the image sensor 304.

One or more control components may be integrated into the same integrated circuit in which the sensor 304 is integrated or may be discrete components. The imager 302 may be incorporated into an imaging head, such as camera head 16 of system 10.

One or more control components 306, such as row circuitry and a timing circuit, may be electrically connected to an imaging controller 320, such as camera control unit 18 of system 10. The imaging controller 320 may include one or more processors 322 and memory 324. The imaging controller 320 receives imager row readouts and may control readout timings and other imager operations, including mechanical shutter operation. The imaging controller 320 may generate image frames, such as video frames from the row and/or column readouts from the imager 302. Generated frames may be provided to a display 350 for display to a user, such as a surgeon.

The system 300 in this example includes a light source 330 for illuminating a target scene. The light source 330 is controlled by the imaging controller 320. The imaging controller 320 may determine the type of illumination provided by the light source 330 (e.g., white light, fluorescence excitation light, or both), the intensity of the illumination provided by the light source 330, and or the on/off times of illumination in synchronization with rolling shutter operation. The light source 330 may include a first light generator 332 for generating light in a first wavelength and a second light generator 334 for generating light in a second wavelength. For example, in some embodiments, the first light generator 332 is a white light generator, which may be comprised of multiple discrete light generation components (e.g., multiple LEDs of different colors), and the second light generator 334 is a fluorescence excitation light generator, such as a laser diode.

The light source 330 includes a controller 336 for controlling light output of the light generators. The controller 336 may be configured to provide pulse width modulation of the light generators for modulating intensity of light provided by the light source 330, which can be used to manage over-exposure and under-exposure. In some embodiments, nominal current and/or voltage of each light generator remains constant and the light intensity is modulated by switching the light generators (e.g., LEDs) on and off according to a pulse width control signal. In some embodiments, a PWM control signal is provided by the imaging controller 336. This control signal can be a waveform that corresponds to the desired pulse width modulated operation of light generators.

The imaging controller 320 may be configured to determine the illumination intensity required of the light source 330 and may generate a PWM signal that is communicated to the light source 330. In some embodiments, depending on the amount of light received at the sensor 304 and the integration times, the light source may be pulsed at different rates to alter the intensity of illumination light at the target scene. The imaging controller 320 may determine a required illumination light intensity for a subsequent frame based on an amount of light received at the sensor 304 in a current frame and/or one or more previous frames. In some embodiments, the imaging controller 320 is capable of controlling pixel intensities via PWM of the light source 330 (to increase/decrease the amount of light at the pixels), via operation of the mechanical shutter 312 (to increase/decrease the amount of light at the pixels), and/or via changes in gain (to increase/decrease sensitivity of the pixels to received light). In some embodiments, the imaging controller 320 primarily uses PWM of the illumination source for controlling pixel intensities while holding the shutter open (or at least not operating the shutter) and maintaining gain levels. The controller 320 may operate the shutter 312 and/or modify the gain in the event that the light intensity is at a maximum or minimum and further adjustment is needed.

Deficiencies of Low-Light Images

Due to constraints in clinical settings, acquired medical images may include noise and artifacts, thus reducing the diagnostic quality of the images. In particular, images captured in low-light conditions suffer from low contrast, poor visibility, and noise contamination. These images have reduced value to medical practitioners, as well as to computer-based diagnostic and treatment systems. For medical practitioners, these images have reduced diagnostic value because human visual perception prefers high-visibility images (e.g., images captured in conditions with higher received light levels for imaging). For diagnostic and treatment systems, the performance of computer vision algorithms may be compromised if the low-light images are used as training data and/or input data due to their poor quality.

Two exemplary scenarios that result in low-light medical images are described herein. It should be appreciated that low-light images can be taken in many other scenarios due to various constraints in the clinical settings. It should further be appreciated that the image enhancement techniques described herein can be applied to enhance any low-light images, regardless of the subjects, modalities, imagers, or image acquisition settings.

Figure 4A:
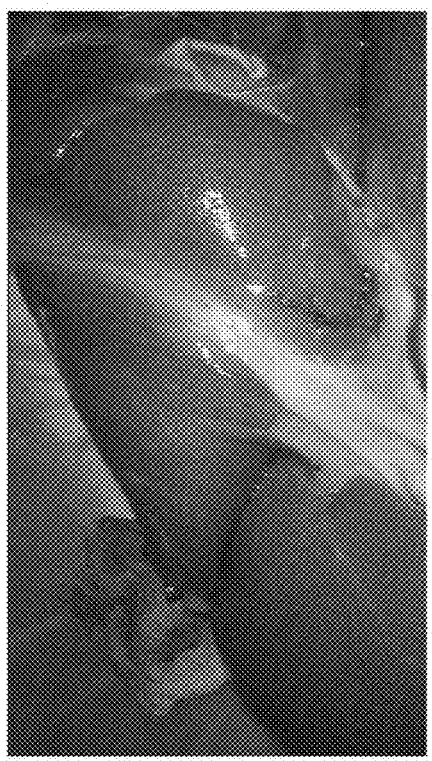
FIG. 4A is an exemplary white light image taken under conditions with higher received light levels for imaging, according to some examples.
Figure 4B:
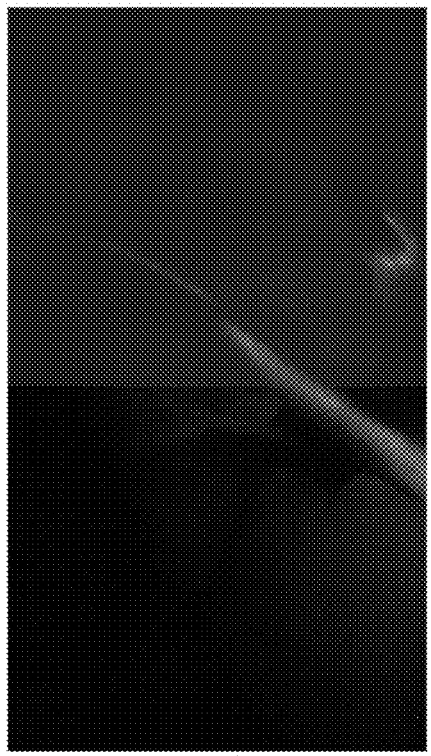
FIG. 4B is an exemplary fluorescence image, according to some examples.

In the first exemplary scenario, low-light images include fluorescence medical images such as NIR medical images. These images are generally low-resolution, greyscale images that contain both high-intensity regions and low-intensity regions. For example, FIGS. 4A and 4B depict a side-by-side comparison between a white light image and a fluorescence image of the same subject. As shown, the fluorescence image depicts a bile duct, but much of the image is a low-intensity and low-contrast region, thus making the tissues surrounding the bile duct difficult to see.

Figure 4C:
FIG. 4C is an exemplary fluorescence image enhanced using a traditional enhancement algorithm, according to some examples.

When displaying images generated in the fluorescence modality (e.g., FIG. 4B), it is often desirable to present certain anatomies of interest (such as bile ducts, tumors, lymph channels, etc.) as high-intensity and high-contrast regions while still showing enough details of surrounding areas to provide an anatomical context (e.g., where the bile duct is relative to the liver). However, this is often a challenging task for traditional contrast enhancement algorithms because NIR and/or fluorescence images usually contain both high-intensity and very low-intensity regions that might cause detrimental artifacts after the fluorescence images are processed. As an example, FIG. 4C is the fluorescence frame enhanced using adaptive histogram equalization ("AHE") techniques. As shown, FIG. 4C has various artifacts, such as deep shadows and diffused high-intensity regions.

In the second exemplary scenario, low-light images include endoscopic images such as white light endoscopic images. Common endoscopes produce noisy, low-intensity images because they are equipped with fairly cheap, off-the-shelf cameras that have small apertures due to the relatively small scope diameters. To obtain better-quality images, state-of-the-art endoscopic systems (e.g., laparoscopic systems) rely on complex camera and lighting designs to mitigate the problem imposed by the small scope diameter. Developing and implementing these complex designs can be time-consuming and expensive. State-of-the-art endoscopic cameras cannot be made smaller without compromising quality of the acquired images. In other words, there is a certain minimum size threshold below which the camera would not be able to absorb enough light to produce legible images.

Method for Enhancing Fluorescence Medical Images

FIG. 5A illustrates an exemplary process 500 for obtaining an enhanced fluorescence medical image of a subject, according to various examples. Process 500 is performed, for example, using one or more electronic devices implementing a software platform. In some examples, process 500 is performed using a client-server system, and the blocks of process 500 are divided up in any manner between the server and one or more client devices. In some examples, process 500 is performed using only a client device or only multiple client devices. In process 500, some blocks are, optionally, combined, the order of some blocks is, optionally, changed, and some blocks are, optionally, omitted. In some examples, additional steps may be performed in combination with the process 500. Accordingly, the operations as illustrated (and described in greater detail below) are exemplary by nature and, as such, should not be viewed as limiting.

At block 502, an exemplary system (e.g., one or more electronic devices) receives a fluorescence medical image of the subject. In some examples, the fluorescence medical image is a NIR fluorescence image such as FIG. 4B. As discussed above, fluorescence medical images are taken in low-light conditions and are generally low-resolution, greyscale images that contain both high-intensity regions and low-intensity regions. For example, as shown in FIG. 4B, the NIR fluorescence image depicts a bile duct, but much of the image is a low-intensity and low-contrast region, thus making the tissues surrounding the bile duct difficult to see.

Figure 5B:
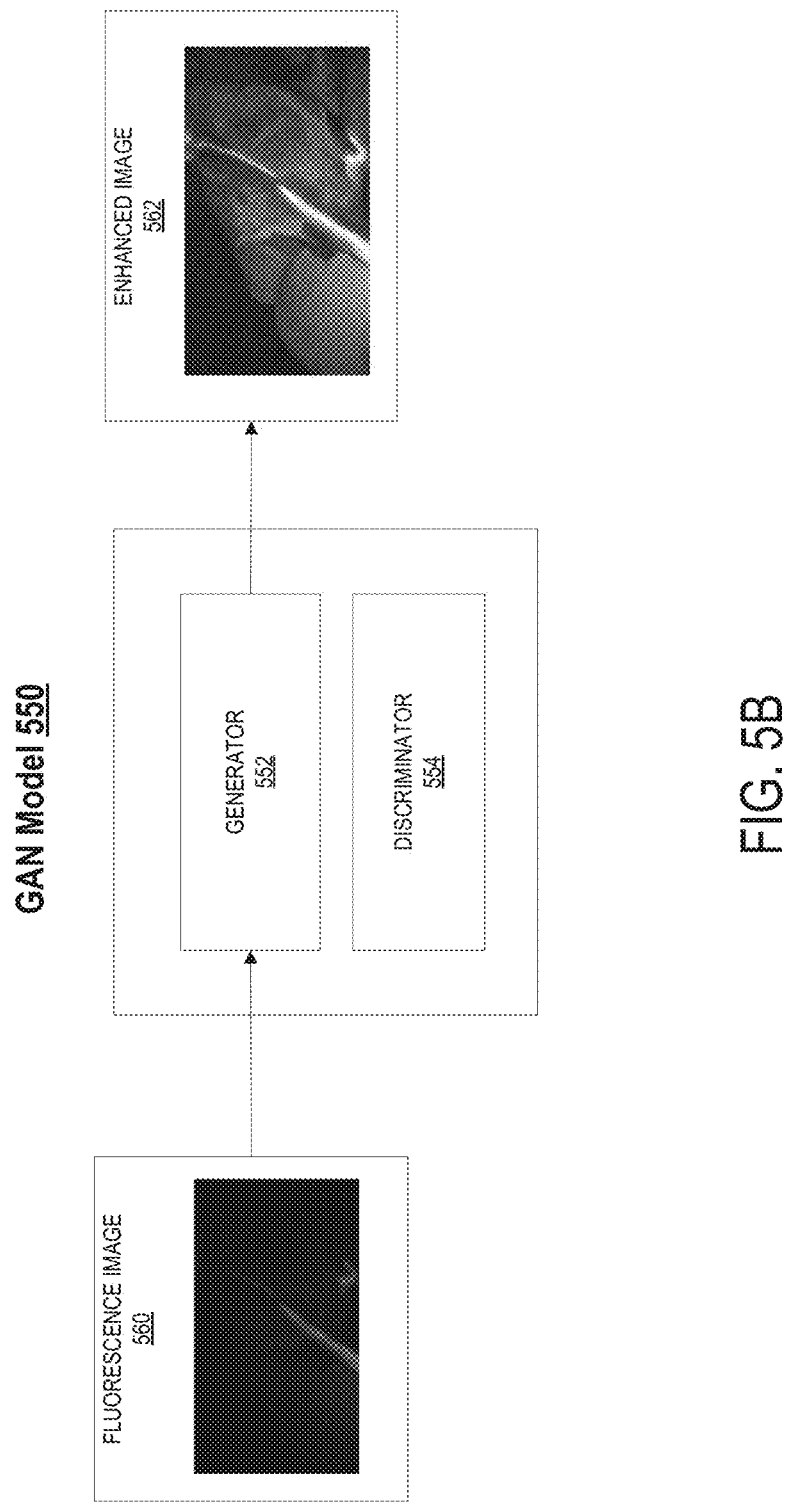
FIG. 5B is an illustration of an exemplary trained GAN model, according to some examples.

At block 504, the system provides the fluorescence medical image to a generator of a trained GAN model. FIG. 5B illustrates an exemplary trained GAN model 550 comprising a generator 552 and a discriminator 554. The generator 552 is configured to receive the input image 560 (e.g., FIG. 4B) and output an enhanced version 562 of the input image 560. In some examples, the GAN is trained such that the generator can receive an image taken in low-light conditions (thus suffering from low contrast, poor visibility, and high noise) and generate an enhanced image more similar to an image taken in conditions with higher received light levels for imaging. The GAN model can be trained using all white light images (e.g., a set of white light images taken in low-light conditions and a set of white light images taken in conditions with higher received light levels for imaging) or a combination of fluorescence images and white light images (e.g., a set of fluorescence images and a set of white light images taken in conditions with higher received light levels for imaging). The configuration and training of the GAN model are described herein with reference to FIGS. 6A-C.

At block 506, the system obtains, from the generator, the enhanced fluorescence medical image of the subject. As shown in FIG. 5B, the generator 552 outputs an enhanced fluorescence medical image 562. The enhanced fluorescence medical image 562 provides better diagnostic value than the input image 560, because the enhanced fluorescence medical image 562 visualizes parts of the anatomy that are not visible in the input image.

The enhanced fluorescence medical image can, for example, be provided (e.g., displayed) to a medical practitioner, who can review the image to identify, recommend, and/or administer a treatment to the patient. In some examples, the enhanced fluorescence medical image can be provided to a computer-based system, which processes the image to identify, recommend, and/or administer a treatment to the patient. For example, the system can provide the enhanced fluorescence medical image to a classification model to automatically identify a disease. Based on the disease, a treatment can be automatically recommended (e.g., via one or more graphical user interfaces). The treatment can also be automatically administered, for example, by a medical device (e.g., a surgical robot) based on the automatically recommended treatment.

The process 500 can, for example, further comprise segmenting the enhanced fluorescence medical image to indicate one or more regions of interest. The one or more regions of interest can include any type of anatomical structures, such as anatomy/tumor segmentation, bodily fluids flow patterns (e.g., blood, bile, urine). In some examples, the one or more regions of interest can include a bile duct, a tumor, a blood vessel, a region of skin tissue, a urinary vessel, a lymph channel, or a lymph node. The segmentation can be performed using an image-segmentation algorithm.

After the regions of interest are identified, the system can apply a color scheme to the enhanced fluorescence medical image to indicate one or more regions of interest before displaying the image. The color scheme can be any pseudo-color map (e.g., a monochromatic scheme) that can help emphasize the regions of interest. For example, greens of different saturations can be applied based on different fluorescence intensity, such that a medical practitioner can see areas of the anatomy where fluorescence has reached the tissue.

The process 500 can further comprise displaying the enhanced fluorescence medical image. In some examples, the system displays the enhanced fluorescence medical image overlaid on a white light image of the subject. The white light image can be a greyscale white light image. For example, the system can display the enhanced fluorescence medical image 562 overlaid on the corresponding white light image (FIG. 4A) in greyscale.

The process 200 can further comprise training a machine-learning model using the enhanced fluorescence medical image. The enhanced fluorescence images can be used for training image-to-image translation generative networks or classification models, providing a better quality dataset compared to the raw fluorescence images. In some examples, the system can provide the enhanced image (or the segmented version) to one or more classification models to identify a disease or generate a prognosis for an outcome (e.g., of a procedure).

Figure 6A:
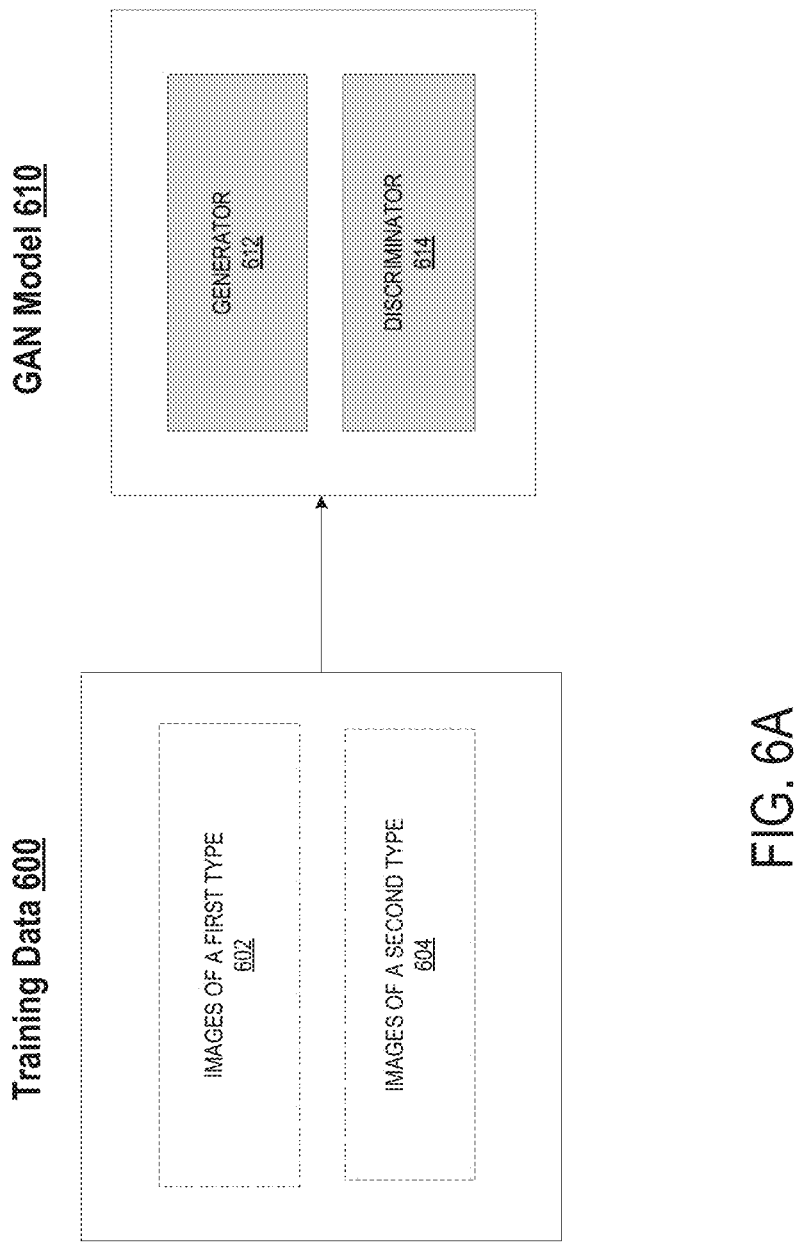
FIG. 6A is an illustration of an exemplary training dataset for training an exemplary GAN model, according to some examples.

FIG. 6A illustrates an exemplary training dataset for training an exemplary GAN model (e.g., model 550 in FIG. 5B), in accordance with some examples. Training dataset 600 comprises one or more images of a first type 602 and one or more images of a second type 604. Images of the first type can be representative of input images of the model, while images of the second type can be the ground-truth images. The training dataset 600 is used to train the GAN model 610 such that the generator 612 can receive an input image of the first type and output an image of the second type. The first type of images can e.g. be images taken in low-light conditions, and the second type of images can e.g. be images taken in conditions with higher received light levels for imaging.

In some examples, low-light images 602 and normal-light images 604 are both white light images. The images can be non-medical images capturing scenes outside the clinical domain, such as houses, campuses, clubs, streets, people, etc. Training dataset 600 can be obtained from publicly available image datasets, which include white light images taken in low-light conditions and in conditions with higher received light levels for imaging. In other words, the GAN model can be trained using white light images exclusively (e.g., non-medical white light images), and directly used to enhance medical images such as fluorescence medical images in process 500.

The images of a first type 602 can comprise a set of fluorescence medical images, and the images of the second type 604 comprise a set of white light images taken in conditions with higher received light levels for imaging. The white light images may be medical images, non-medical images, or a combination thereof. In some examples, the GAN model 610 can first be trained using all white light images (e.g., low-light white light images as images 602 and normal-light white light images as images 604), and then further trained using fluorescence images as images 602 and white light images as images 604 (e.g., via transfer learning). The white light images can e.g. be converted into greyscale before being included in the training data 600.

In some examples, the images of a first type 602 comprise images acquired using a first camera, and the images of the second type 604 comprise images acquired using a second camera. For example, images 602 can include a set of fluorescence medical images acquired using a first camera, and images 604 can include a set of white light surgical images acquired with a second camera having a higher resolution and/or a larger image sensor than the first camera.

The training data 600 can be pre-processed to have the same format (e.g., PNG format) and the same size (e.g., number of pixels). In some examples, the training data comprises a plurality of representative images for training (e.g., >1000 images). The low-light images 602 and the images 604 can e.g. be unpaired: for a given low-light image in 602, there is no corresponding normal-light image capturing the exact same subject in 604, as described in detail below.

Figure 6B:
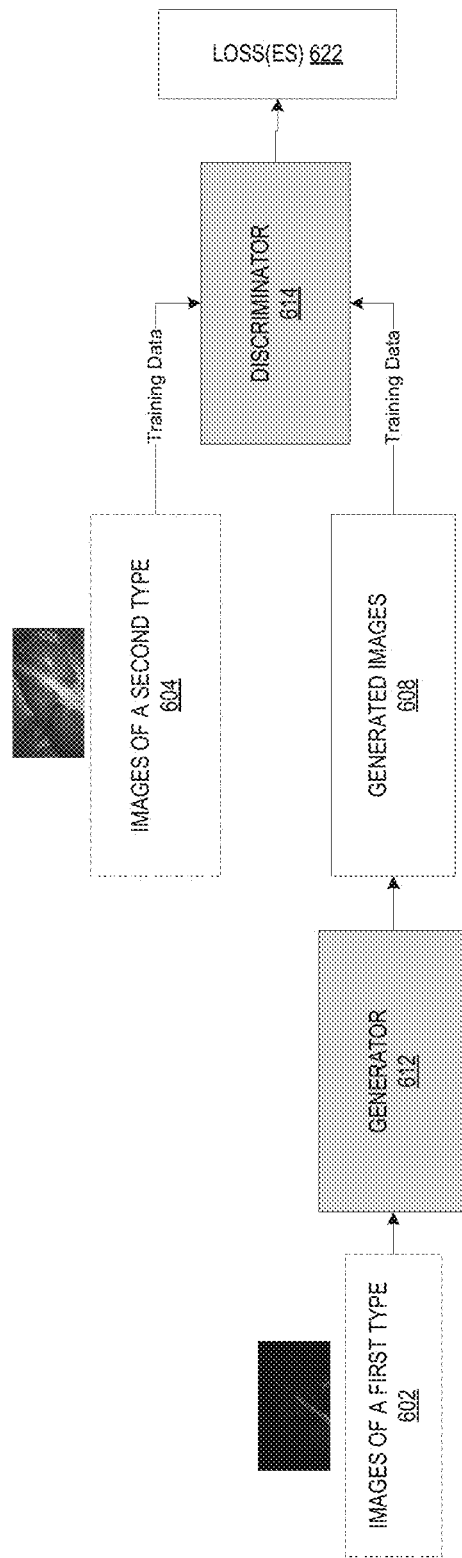
FIG. 6B is an illustration of an exemplary process for training an exemplary GAN model, according to some examples.

FIG. 6B illustrates an exemplary process for training an exemplary GAN model (e.g., GAN model 610 in FIG. 6A), in accordance with some examples. The GAN model comprises a generator 612 and a discriminator 614. Both can be implemented as neural networks. The generator 612 is configured to receive an image of a first type (e.g., low-light image) and translate it into an image of a second type (e.g., normal-light image). The discriminator is configured to receive an image and provide an output indicative of whether the input image is a synthetic image (e.g., generated normal-light image) or a real image (e.g., real normal-light image).

During training, the generator output can be connected directly to the discriminator input, such that each generated image is provided to the discriminator to provide an output. Depending on the discriminator's output, one or more losses can be calculated according to loss function(s). In some examples, the loss(es) are back-propagated through the discriminator 614 and the generator 612 to adjust the generator weights and the discriminator weights. In particular, the loss(es) can be used to update the generator's weights such that the generator learns to generate images that the discriminator will classify as real images. The loss(es) can be used to update the discriminator's weights such that the discriminator learns to maximize the difference between its outputs based on real images and its outputs based on synthetic images.

In some examples, the generator 612 and the discriminator 614 are trained in alternating periods. In each period, the discriminator trains for one or more epochs, and the generator trains for one or more epochs. During the discriminator training, the generator may remain constant. Similarly, during the generator training, the discriminator may remain constant.

Figure 6C:
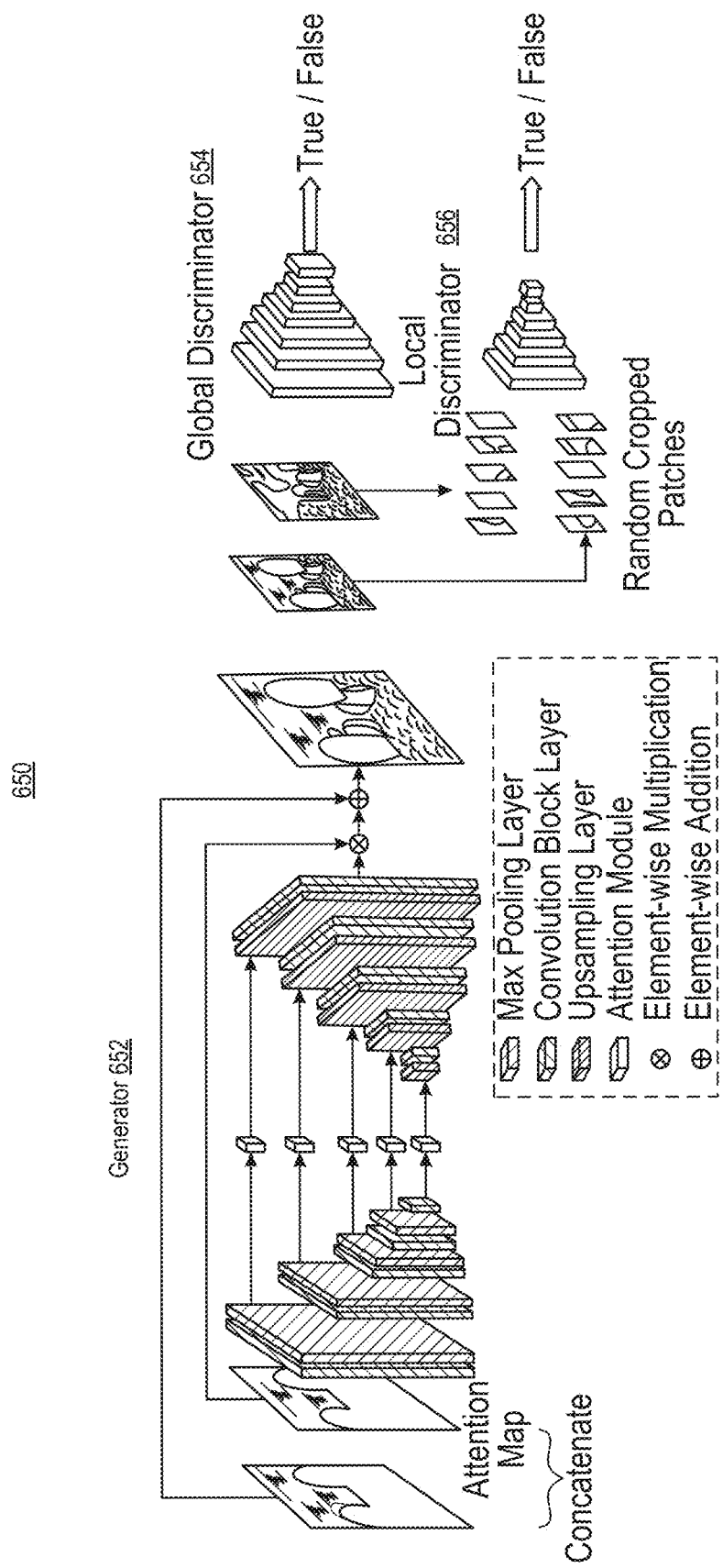
FIG. 6C is an illustration of an exemplary implementation of an exemplary GAN model, according to some examples.

FIG. 6C illustrates an exemplary implementation of an exemplary GAN model (e.g., model 550 in FIG. 5B, model 610 in FIG. 6A), in accordance with some examples. The GAN model is configured to enhance low-light images.

In some examples, the GAN model can be trained without paired images. In other words, the training dataset does not need to contain a low-light image and a normal-light image of the same subject. Eliminating the need for paired images is advantageous because paired images can be difficult or even impractical to obtain. For example, it is generally difficult to simultaneously capture low-light and normal-light image pairs of the same visual scene. While synthesizing low-light images from normal-light images can sometimes help, such synthesized images are usually not photorealistic enough, leading to various artifacts when the trained model is applied to real-world low-light images. Thus, it would be advantageous for the GAN model to be trained without relying on exactly paired images.

With reference to FIG. 6C, the generator 652 of the exemplary GAN model 650 comprises a neural network as its backbone. The backbone neural network can be a U-Net network guided with self-regularized attention. In the depicted example, the generator is implemented with 8 convolutional blocks. Each block includes two 3×3 convolutional layers, followed by a LeakyReLU layer and a batch normalization layer. At the upsampling stage, the standard deconvolutional layer is replaced with one bilinear upsampling layer plus one convolutional layer to mitigate the checkerboard artifacts. By extracting multi-level features from different depth layers, the U-Net preserves rich texture information and synthesizes high quality images using multi-scale context information.

The generator 652 has an attention mechanism. An attention mechanism is a technique that mimics cognitive attention. The mechanism enhances the important parts of the input data and fades out the rest, such that the network may devote more computing power on that small but important part of the data. In a low-light image of spatially varying light condition, it is desirable to enhance the dark regions more than bright regions, so that the output image has neither over-nor under-exposure. Thus, the model takes the illumination channel I of the input RGB image, normalize it to [0,1], and then use 1−I (element-wise difference) as the self-regularized attention map. The model then resizes the attention map to fit each feature map and multiplies it with all intermediate feature maps as well as the output image. The attention map is a form of self-regularization and shows to improve the visual quality consistently.

With reference to FIG. 6C, the GAN model comprises two discriminators, a global discriminator 654 and a local discriminator 656, to direct the global and local information. A single image-level discriminator often fails on spatially-varying light images; if the input image has some local area that needs to be enhanced differently from other parts, e.g., a small bright region in an overall dark background, the global image discriminator alone is often unable to provide the desired adaptivity. To enhance local regions adaptively in addition to improving the light globally, the model comprises two discriminators, both using PatchGAN for real/fake discrimination. The global discriminator 654 is image-level, while the local discriminator 656 takes randomly cropped local patches from both output and real normal-light images, and uses learning to distinguish whether they are real (from real images) or synthetic (from enhanced outputs). Such a global-local structure ensures all local patches of an enhanced images look like realistic normal-light ones, which is critical in avoiding local over- or under-exposures.

In some examples, the global discriminator has a relativistic discriminator structure, which estimates the probability that real data is more realistic than synthetic data and also directs the generator to synthesize a fake image that is more realistic than typical synthetic images. The standard function of relativistic discriminator is:

$$D_{Ra}(x_r, x_f) = \sigma(C(x_r) - \mathbb{E}_{x_f \sim \mathbb{P}_{fake}}[C(x_f)]),$$

$$D_{Ra}(x_f, x_r) = \sigma(C(x_f) - \mathbb{E}_{x_r \sim \mathbb{P}_{real}}[C(x_r)]),$$

where C denotes the network of discriminator, $x_r$ and $x_f$ are sampled from the real and fake distribution, and $\sigma$ represents the sigmoid function.

The loss functions for the global discriminator D and the generator G are:

$$\mathcal{L}_D^{Global} = \mathbb{E}_{x_r \sim \mathbb{P}_{real}}[(D_{Ra}(x_r, x_f) - 1)^2] + \mathbb{E}_{x_f \sim \mathbb{P}_{fake}}[D_{Ra}(x_f, x_r)^2],$$

$$\mathcal{L}_G^{Global} = \mathbb{E}_{x_f \sim \mathbb{P}_{fake}}[(D_{Ra}(x_f, x_r) - 1)^2] + \mathbb{E}_{x_r \sim \mathbb{P}_{real}}[D_{Ra}(x_r, x_f)^2],$$

For the local discriminator, the system can randomly crop a number of (e.g., 5) patches from the output and real images each time. The adversarial loss can be provided as:

$$\mathcal{L}_D^{Local} = \mathbb{E}_{x_r \sim \mathbb{P}_{real-patches}}[(D(x_r) - 1)^2] + \mathbb{E}_{x_f \sim \mathbb{P}_{fake-patches}}[(D(x_f) - 0)^2],$$

$$\mathcal{L}_G^{Local} = \mathbb{E}_{x_r \sim \mathbb{P}_{fake-patches}}[(D(x_f) - 1)^2],$$

The GAN model uses a self feature preserving loss to guide the training process and maintain the textures and structures. The self feature preserving loss $L_{SFP}$ can be defined as $$\mathcal{L}_{SFP}(I^L) = \frac{1}{W_{i,j} H_{i,j}} \sum_{x=1}^{W_{i,j}} \sum_{y=1}^{H_{i,j}} (\phi_{i,j}(I^L) - \phi_{i,j}(G(I^L)))^2$$

where $I^L$ denotes the input low-light image and $G(I^L)$ denotes the generator's enhanced output. $\phi_{i,j}$ denotes the feature map (e.g., extracted from a VGG-16 model pretrained on ImageNet). i represents its i-th max pooling, and j represents its j-th convolutional layer after i-th max pooling layer. $W_{i,j}$ and $H_{i,j}$ are the dimensions of the extracted feature maps.

For the local discriminator, the cropped local patches from input and output images may also be regularized by a similarly defined self feature preserving loss, $L_{SFP}^{Local}$. The overall loss function for training the GAN model is thus written as:

$$\text{Loss} = \mathcal{L}_{SFP}^{Global} + \mathcal{L}_{SFP}^{Local} + \mathcal{L}_G^{Global} + \mathcal{L}_G^{Local}$$

$L_{SFP}^{Global}$ is a global self-feature preserving loss measured as a distance between a latent feature space of the input low-light and its enhanced normal-light output version (the feature vectors are extracted using VGG-16 model pretrained on ImageNet dataset).

$L_{SFP}^{Local}$ equivalent to $L_{SFP}^{Global}$ but applied to randomly selected local patches cropped from input and output images.

$L_G^{Global}$ is the global adversarial loss estimated as the probability that real image is more realistic than fake image.

$L_G^{Local}$ is equivalent to $L_G^{Global}$ but applied to randomly selected local patches cropped from input and output images.

The GAN model can for example comprise an EnlightenGAN model. Details of the EnlightenGAN model can be found in Jiang et al., "EnlightenGAN: Deep Light Enhancement without Paired Supervision," Journal of Latex Class Files, Vol. 14, No. 8, August 2015.

The GAN models described herein can generate the enhanced frames in real time. The GAN models may be deployed on edge devices. In addition, various software optimization tools and techniques (e.g., TensorRT) can be employed to increase the inference speed. In some examples, training and/or retraining of the GAN models can be performed using one or more state-of-the-art cloud GPUs (e.g., P100).

Figure 7A:
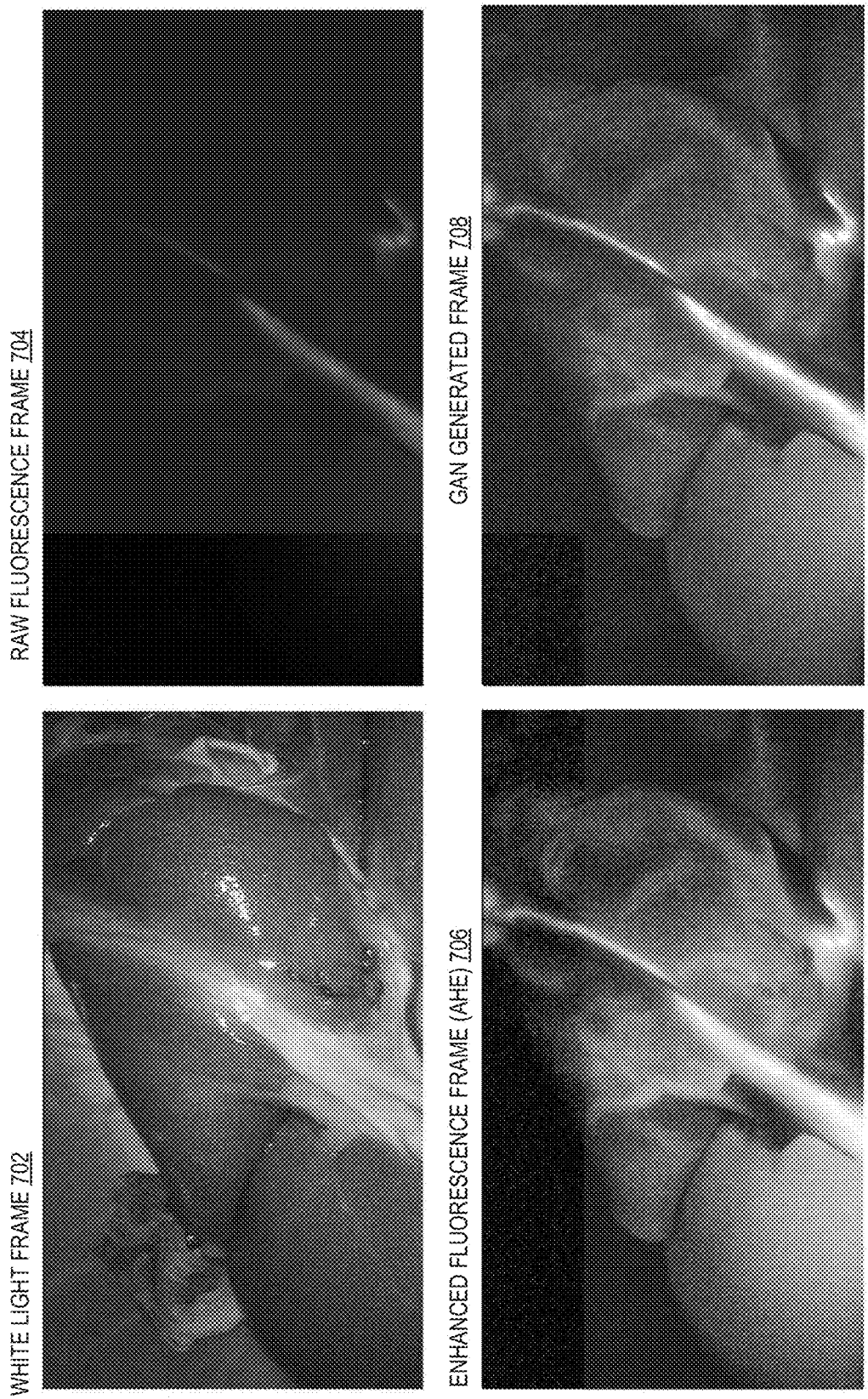
FIG. 7A is an illustration of an exemplary set of images, according to some examples.
Figure 7B:
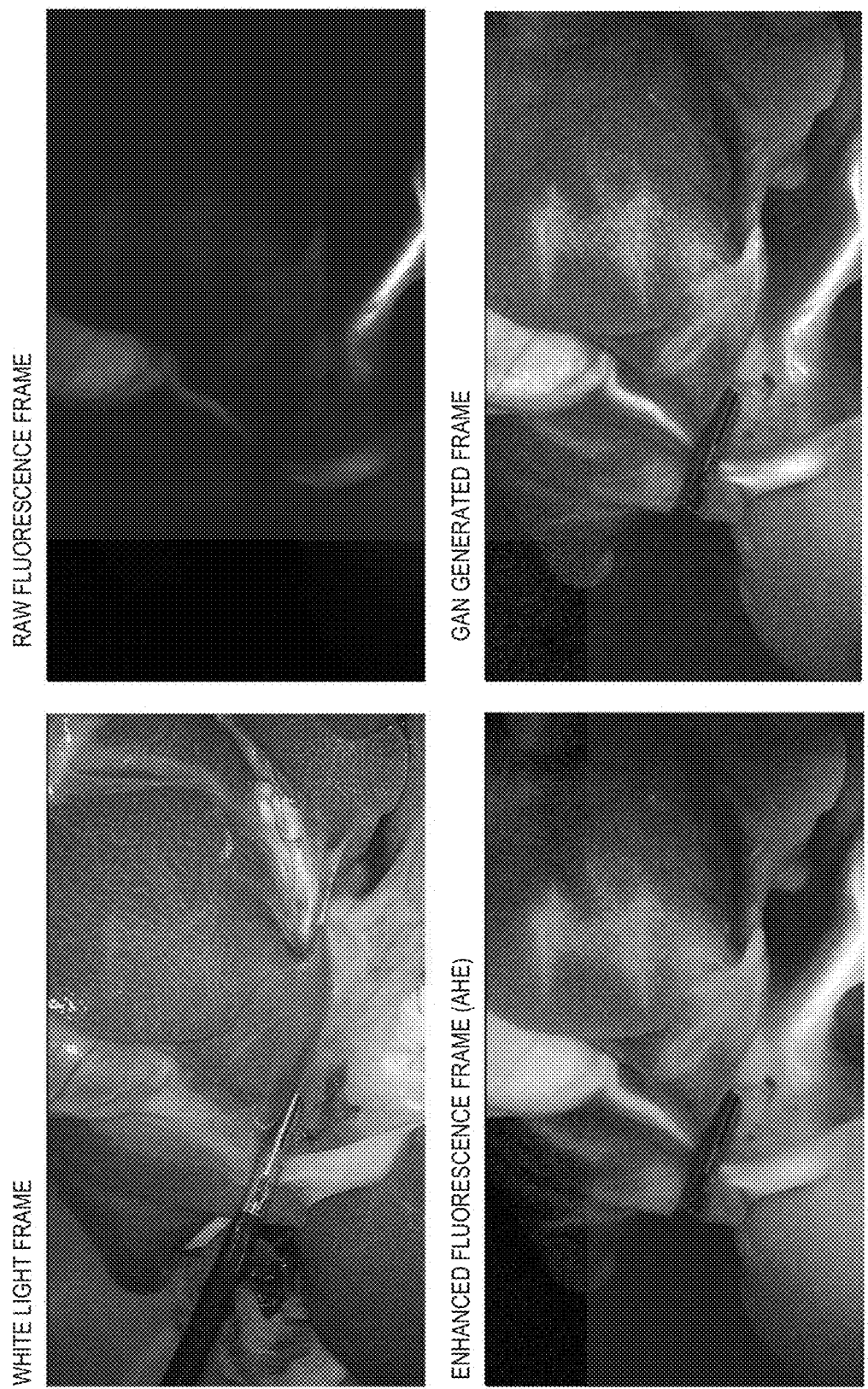
FIG. 7B is an illustration of another exemplary set of images, according to some examples.

FIG. 7A illustrates an exemplary set of images, in accordance with some examples. Image 702 is a white light image frame, while image 704 is a raw fluorescence image frame of the same subject. As discussed above, the image 704 is taken in low-light conditions and therefore suffers from low contrast, poor visibility, and noise contamination. Image 706 is a fluorescence frame enhanced using traditional adaptive histogram equalization ("AHE") techniques. As shown, while the image 706 provides better contrast and visibility, various artifacts (e.g., deep shadows, diffusion effects) are introduced. Thus, the anatomical structures of interest (e.g., bile ducts) are blurred, while the liver in the background has uneven intensities and obscures some details of the bile ducts. Finally, image 708 is the fluorescence frame enhanced using a GAN model described herein (e.g., model 550, model 610, model 650). As shown, the image 708 preserves high level of details in high intensity areas (e.g., bile ducts and the gall bladder) thus clearly defining the anatomical structures of interest, while showing the surrounding tissue (e.g., liver) as uniformly lit (in contrast to deep shadows and diffused high-intensity regions present in image 706). FIG. 7B illustrates another exemplary set of images, similarly showing the advantages of the GAN model.

The GAN-generated image shows the gall bladder in finer detail, while the AHE image shows the gall bladder as an almost uniform white blob.

Method for Enhancing Endoscopic Images

Figure 8A:
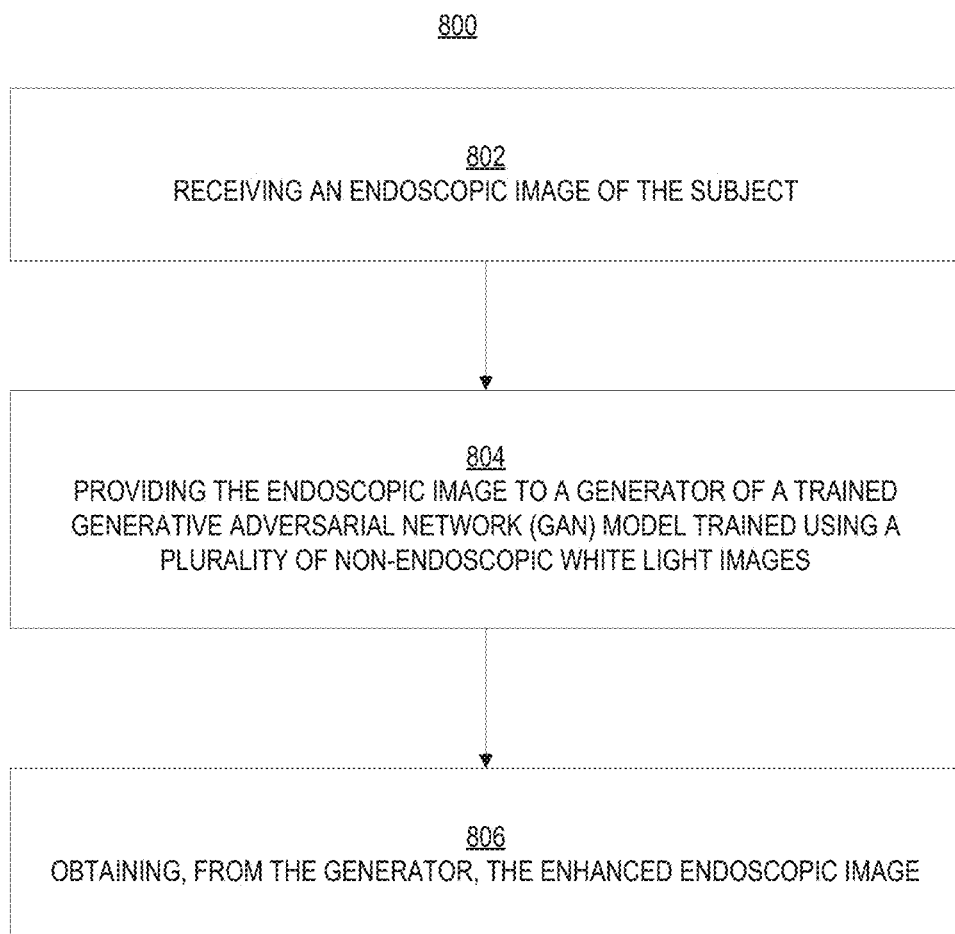
FIG. 8A is an illustration of an exemplary process for obtaining an enhanced endoscopic image of a subject, according to some examples.

FIG. 8A illustrates an exemplary process 800 for obtaining an enhanced endoscopic image of a subject, according to various examples. Process 800 is performed, for example, using one or more electronic devices implementing a software platform. In some examples, process 800 is performed using a client-server system, and the blocks of process 800 are divided up in any manner between the server and one or more client devices. In some examples, process 800 is performed using only a client device or only multiple client devices. In process 800, some blocks are, optionally, combined, the order of some blocks is, optionally, changed, and some blocks are, optionally, omitted. Additional steps may be performed in combination with the process 800. Accordingly, the operations as illustrated (and described in greater detail below) are exemplary by nature and, as such, should not be viewed as limiting.

At block 802, an exemplary system (e.g., one or more electronic devices) receives an endoscopic image of the subject. As discussed above, common endoscopes produce noisy, low-intensity images because they are equipped with fairly cheap, off-the-shelf cameras that have small apertures due to the relatively small scope diameters.

At block 804, the system provides the endoscopic image to a generator of a trained GAN model. The generator is configured to receive an input image (e.g., endoscopic image) and output an enhanced version of the input image. The GAN can be trained such that the generator can receive an endoscopic image taken in low-light conditions (thus suffering from low contrast, poor visibility, and high noise) and generate an enhanced image more similar to an image taken in conditions with higher received light levels for imaging. The GAN model can be trained using all non-endoscopic images, all endoscopic images, or a combination thereof. The configuration and training of the GAN model are described herein with reference to FIG. 8B.

Figure 8B:
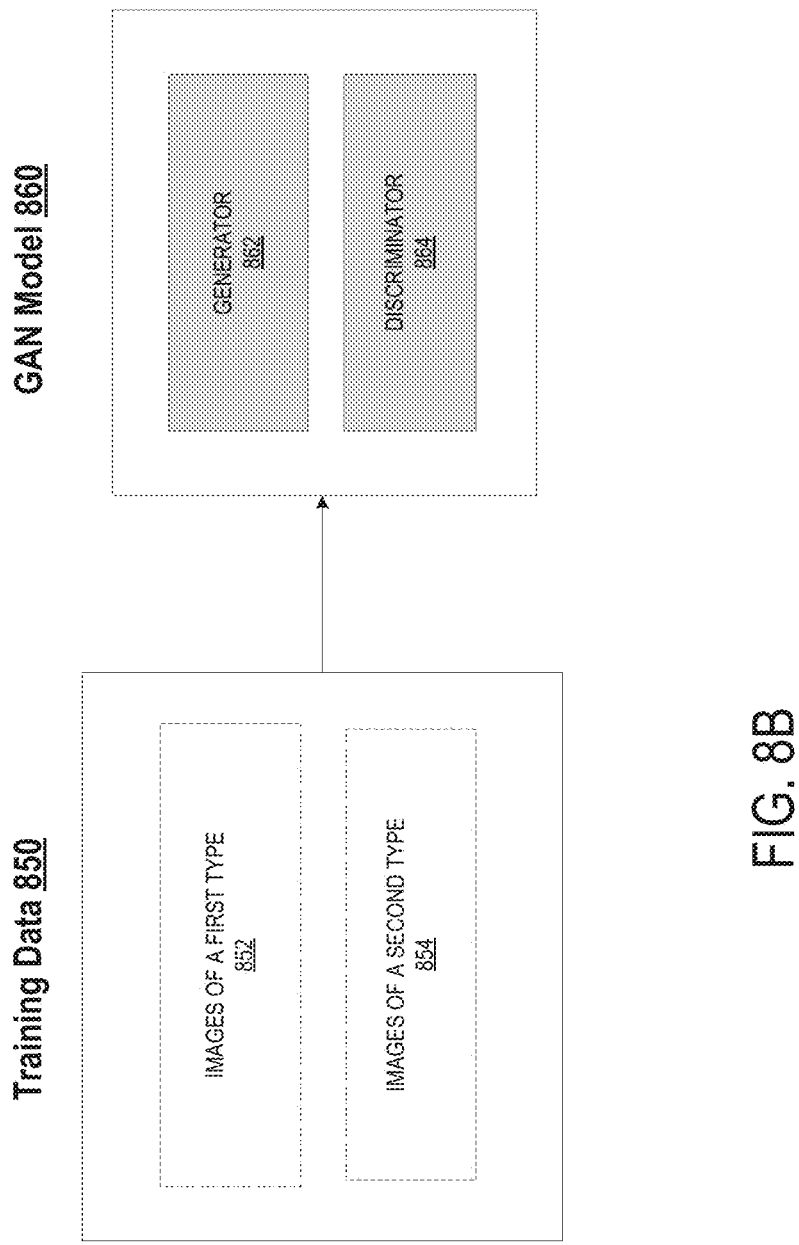
FIG. 8B is an illustration of an exemplary training dataset for training an exemplary GAN model, according to some examples.

FIG. 8B illustrates an exemplary training dataset for training an exemplary GAN model (e.g., model used in process 800), in accordance with some examples. Training dataset 850 comprises one or more images of a first type 852 and one or more images of a second type 854. Images of the first type can be representative of input images, while images of the second type can be ground-truth images. The training dataset 850 is used to train the GAN model 860 such that the generator 852 can receive an input image of the first type and output an image of the second type. In some examples, the first type of images are images taken in low-light conditions, and the second type of images are images taken in conditions with higher received light levels for imaging.

Low-light images 852 and normal-light images 854 can e.g. both be non-endoscopic white light images. The images can be non-medical images capturing scenes outside the clinical domain, such as houses, campuses, clubs, streets, people, etc. Training dataset 850 can be obtained from publicly available image datasets, which include white light images taken in low-light conditions and in conditions with higher received light levels for imaging. In other words, the GAN model 850 can be trained using non-endoscopic white light images exclusively, and directly used to enhance medical images such as endoscopic images in process 800.

In some examples, the images of the first type 852 comprise a set of images captured by a first endoscopic camera, and the images of the second type 854 comprise a set of images captured by a second endoscopic camera. The first endoscopic camera is of a lower quality (e.g., lower resolution) than the second endoscopic camera. In some embodiments, the first endoscopic camera has a lower endoscopic camera diameter than the second endoscopic camera.

In some examples, the images of the first type 852 comprise a set of images captured by an endoscopic camera, and the images of the second type 854 comprise a set of images (e.g., white light images) captured by an external camera (e.g., an open-field surgical camera). The external camera can be a high-end generic camera not designed for endoscopic use and thus can have a much larger aperture and/or a larger image sensor. In some embodiments, the external camera generates white-light surgical images.

In some examples, the GAN model 850 can first be trained using all non-endoscope images, and then further trained using endoscopic images (e.g., via transfer learning). In some examples, the training images are converted into greyscale before being included in the training data 850.

In some examples, the training data 850 is pre-processed to have the same format (e.g., PNG format) and the same size (e.g., number of pixels). In some examples, the training data comprises a plurality of representative images for training (e.g., >1000 images). In some examples, the low-light images 852 and the images 854 are unpaired.

The GAN model 860 can be trained using the training data 850 in the same or similar manner as described above with reference to FIGS. 6B and 6C.

At block 806, the system obtains, from the generator, the enhanced endoscopic image.

The enhanced endoscopic medical image can be provided (e.g., displayed) to a medical practitioner, who can review the image to identify, recommend, and/or administer a treatment to the patient. In some examples, the enhanced endoscopic medical image can be provided to a computer-based system, which processes the image to identify, recommend, and/or administer a treatment to the patient. For example, the system can provide the enhanced endoscopic medical image to a classification model to automatically identify a disease. Based on the disease, a treatment can be automatically recommended (e.g., via one or more graphical user interfaces). The treatment can also be automatically administered, for example, by a medical device (e.g., a surgical robot) based on the automatically recommended treatment.

The process 800 can further comprise segmenting the enhanced endoscopic image to indicate one or more regions of interest. The one or more regions of interest can include any type of anatomical structures, such as anatomy/tumor segmentation, bodily fluids flow patterns (e.g., blood, bile, urine). In some examples, the one or more regions of interest can include a bile duct, a tumor, a blood vessel, a region of skin tissue, a urinary vessel, a lymph channel, or a lymph node. The segmentation can be performed using an image-segmentation algorithm.

After the regions of interest are identified, the system can apply a color scheme to the enhanced endoscopic image to indicate one or more regions of interest before displaying the image. The color scheme can be any pseudo-color map (e.g., a monochromatic scheme) that can help emphasize the regions of interest.

In some examples, the process 800 further comprises displaying the enhanced endoscopic medical image. In some examples, the process 800 further comprises training a machine-learning model using the enhanced endoscopic medical image. The enhanced endoscopic medical images can be used for training image-to-image translation generative networks or classification models, providing a better quality dataset compared to the low-light endoscopic images. In some examples, the system can provide the enhanced image (or the segmented version) to one or more classification models to identify a disease or generate a prognosis for an outcome (e.g., of a procedure).

The foregoing description, for the purpose of explanation, has been described with reference to specific examples or embodiments. However, the illustrative discussions above are not intended to be exhaustive or to limit the invention to the precise forms disclosed. For the purpose of clarity and a concise description, features are described herein as part of the same or separate embodiments; however, it will be appreciated that the scope of the disclosure includes embodiments having combinations of all or some of the features described. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

What is claimed is:

1. A method of obtaining an enhanced fluorescence medical image of a subject, comprising:
receiving a fluorescence medical image of the subject;
providing the fluorescence medical image to a generator of a trained generative adversarial network (GAN) model trained using a first set of white light images associated with a first light level and a second set of white light images associated with a second light level, the second light level higher than the first light level; and
obtaining, from the generator, the enhanced fluorescence medical image of the subject wherein one or more anatomical structures in a field of view of the fluorescence medical image are clearer in the enhanced fluorescence medical image.

2. The method of claim 1, further comprising: displaying the enhanced fluorescence medical image.

3. The method of claim 2, further comprising: applying a color scheme to the enhanced fluorescence medical image to indicate one or more regions of interest.

4. The method of claim 1, further comprising: displaying the enhanced fluorescence medical image overlaid on a white light image of the subject.

5. The method of claim 4, wherein the white light image is a greyscale white light image.

6. The method of claim 1, further comprising: segmenting the enhanced fluorescence medical image to indicate one or more regions of interest.

7. The method of claim 6, wherein the one or more regions of interest comprise: a bile duct, a tumor, a blood vessel, a region of skin tissue, a urinary vessel, a lymph channel, or a lymph node.

8. The method of claim 1, further comprising: providing the enhanced fluorescence medical image to a classification model to identify a disease.

9. The method of claim 1, further comprising: generating a prognosis for an outcome based on the enhanced fluorescence medical image.

10. The method of claim 1, further comprising: training a machine-learning model using the enhanced fluorescence medical image.

11. The method of claim 1, further comprising: after training the generator on the first set of white light images and the second set of white light images, training the generator using a set of fluorescence medical images and a third set of white light images.

12. The method of claim 11, wherein the third set of white light images are greyscale images.

13. The method of claim 11, wherein the set of fluorescence medical images are acquired using a first camera, and wherein the third set of white light images are surgical images acquired with a second camera having a higher resolution than the first camera.

14. The method of claim 1, wherein the generator comprises a trained U-net neural network.

15. The method of claim 1, wherein the generator comprises an attention map.

16. The method of claim 1, wherein the generator is trained using a self feature preserving loss.

17. The method of claim 1, wherein the GAN model includes one or more discriminators.

18. The method of claim 17, wherein the one or more discriminators comprise a local discriminator and a global discriminator.

19. The method of claim 1, wherein the GAN model comprises an EnlightenGAN model.

20. A system, comprising:
one or more processors;
one or more memories; and
one or more programs, wherein the one or more programs are stored in the one or more memories and configured to be executed by the one or more processors, the one or more programs including instructions for:
receiving a fluorescence medical image of the subject;
providing the fluorescence medical image to a generator of a trained generative adversarial network (GAN) model trained using a first set of white light images associated with a first light level and a second set of white light images associated with a second light level, the second light level higher than the first light level; and
obtaining, from the generator, the enhanced fluorescence medical image of the subject, wherein one or more anatomical structures in a field of view of the fluorescence medical image are clearer in the enhanced fluorescence medical image.

21. A non-transitory computer-readable storage medium storing one or more programs, the one or more programs comprising instructions, which when executed by one or more processors of an electronic device, cause the electronic device to:
receive a fluorescence medical image of the subject;
provide the fluorescence medical image to a generator of a trained generative adversarial network (GAN) model trained using a first set of white light images associated with a first light level and a second set of white light images associated with a second light level, the second light level higher than the first light level; and
obtain, from the generator, the enhanced fluorescence medical image of the subject wherein one or more anatomical structures in a field of view of the fluorescence medical image are clearer in the enhanced fluorescence medical image.

* * * * *